United States Patent [19]

Iwanaga et al.

[11] Patent Number: 4,836,052
[45] Date of Patent: Jun. 6, 1989

[54] COMPACT CHANGE SPEED TRANSMISSION

[75] Inventors: Kazuyoshi Iwanaga, Atsugi; Toshio Yamaguchi, Zama, both of Japan

[73] Assignee: Nissan Motor Co., Ltd., Yokohama, Japan

[21] Appl. No.: 29,122

[22] Filed: Mar. 23, 1987

[30] Foreign Application Priority Data

Mar. 24, 1986 [JP] Japan ................................. 61-65268

[51] Int. Cl.$^4$ ............................................. F16H 57/10
[52] U.S. Cl. ...................................... 74/759; 74/758; 74/753; 192/85 AA
[58] Field of Search ................ 74/758, 759, 760, 761, 74/753, 763; 192/85 AA, 85 A

[56] References Cited

U.S. PATENT DOCUMENTS

| | | | |
|---|---|---|---|
| 3,053,117 | 9/1962 | Hensel | 74/763 |
| 3,365,985 | 1/1968 | Johnson | 74/761 |
| 3,483,771 | 12/1969 | Foerster et al. | 74/759 |
| 3,554,057 | 1/1971 | Michnay et al. | 74/761 |
| 3,584,520 | 6/1971 | Borman | 74/763 |
| 3,599,512 | 8/1971 | Wayman | 192/85 AA X |
| 3,611,835 | 10/1971 | Borman | 74/759 |
| 3,776,066 | 12/1973 | Piret | 74/763 |
| 3,799,004 | 3/1974 | Hause | 74/753 X |
| 3,862,581 | 1/1975 | O'Malley | 74/759 |
| 3,877,321 | 4/1975 | Storer, Jr. | 192/85 AA X |
| 3,922,932 | 12/1975 | Maurice et al. | 74/763 |
| 4,157,046 | 6/1979 | O'Malley | 74/763 |
| 4,793,215 | 12/1988 | Sugano | 74/758 |

OTHER PUBLICATIONS

"Automotive Engineering", vol. 36, No. 6, 1982, p. 628.

Primary Examiner—Dirk Wright
Assistant Examiner—William Gehris
Attorney, Agent, or Firm—Foley & Lardner, Schwartz, Jeffery, Schwaab, Mack, Blumenthal & Evans

[57] ABSTRACT

A compact change speed transmission comprising two planetary gear sets which are selectively controlled by clutches and brakes to provide four forward speed ratios and a reverse speed ratio. There are a forward clutch, a forward one-way clutch, and a low one-way clutch which, when the forward clutch is engaged, provide a path of transmission of reaction to a stationary part thereby establishing a path of transmission of torque through at least a part of two planetary gear sets to establish a predetermined one forward speed ratio. A low and reverse brake and an overrun clutch are provided. When both of them are engaged, they hinder the action of the low one-way clutch and that of the forward one-way clutch thereby providing engine braking during running with the predetermined one forward speed ratio. For compact arrangement, the overrun clutch is disposed within a clutch drum of the forward clutch with its actuating piston slidably received by an actuating piston of the forward clutch.

31 Claims, 2 Drawing Sheets

FIG.2

|   |      | F/C | H/C | R/C | OR/C | B/B | LR/B | FO/C | LO/C |
|---|------|-----|-----|-----|------|-----|------|------|------|
| D | 1    | O   |     |     |      |     |      | O    | O    |
|   | 2    | O   |     |     |      | O   |      | O    |      |
|   | 3    | O   | O   |     |      |     |      | O    |      |
|   | 4    | O   | O   |     |      | O   |      |      |      |
| III | 1  | O   |     |     | O    |     |      |      |      |
|   | 2    | O   |     |     | O    | O   |      |      |      |
|   | 3    | O   | O   |     | O    |     |      |      |      |
| II | 1   | O   |     |     | O    |     |      |      |      |
|   | 2    | O   |     |     | O    | O   |      |      |      |
| I | 1    | O   |     |     | O    |     | O    |      |      |
| R | Rev. |     |     | O   |      |     | O    |      |      |
| P, N |   |     |     |     |      |     |      |      |      |

COMPACT CHANGE SPEED TRANSMISSION

BACKGROUND OF THE INVENTION

The present invention relates to a change speed transmission for an automatic transmission of a vehicle, and more particularly to a compact arrangement of clutches and brakes.

The present invention aims at improving a change speed transmission such that its axial dimension is reduced.

A THM 700-4R type automatic transmission manufactured by U.S. General Motors is known. As shown in a publication "AUTOMOTIVE ENGINEERING" Vol. 36, No. 6, 1982 issued in 1982 by Japanese Automotive Engineering Society, this known automatic transmission can provide four forward speed ratios and a reverse speed ratio and uses two planetary gear sets. The planetary gear sets are selectively controlled by clutches and brakes which comprise a forward clutch, an input one-way clutch, a low one-way clutch, and a low & reverse clutch (which may be called as a low & reverse brake). When the forward clutch is engaged, first forward speed ratio is established. If engine braking is required under this condition, both the overrun clutch and low & reverse clutch are engaged to hinder the action of the input one-way clutch and low one-way clutch thereby provide engine braking at the first speed ratio.

In this change speed transmission, the forward clutch and the overrun clutch are disposed in tandem without any space-saving idea. Besides, the low & reverse brake and the forward clutch are arranged in tandem. This known arrangement results in an increased axial dimension of a change speed transmission.

An object of the present invention is to provide a compact change speed transmission wherein clutch and brake means are arranged in a space-saving manner as to contribute to a reduction of an axial dimension of the change speed transmission.

SUMMARY OF THE INVENTION

A change speed transmission according to the present invention comprises two planetary gear sets which are selectively controlled by clutches and brakes to provide a plurality of forward speed ratios and a reverse speed ratio. There are two clutches, i.e., a first clutch and a second clutch. The first clutch is kept engaged to form a part of a path of transmission of reaction to a stationary part thereby establish a path of transmission of torque through at least a part of the first and second planeteary gear sets to achieve a predetermined one forward speed ratio. The second clutch is also engaged if engine braking is required at the predetermined one forward speed ratio. For compact arrangement, the second clutch is disposed within a drum-shaped member which forms a part of the first clutch. More particularly, an actuating piston of the second clutch is slidably disposed within an actuating piston of the first clutch.

The first clutch is a forward clutch and the second clutch is an overrun clutch. The change speed according to the present invention features also the arrangement of a low & reverse brake such that the low & reverse brake is operatively disposed between the drum-shaped member of the forward clutch and the stationary transmission part which extends over the drum-shaped member and radially outwardly thereof.

BRIEF DESCRIPTION OF THE DRAWINGS

FIG. 2 is a diagrammatic shifting chart, illustrating the pattern of engagement and disengagement of the various shifting members in the different individual speed ratios and different manually selectable ranges of the transmission of FIG. 1.

DETAILED DESCRIPTION OF THE INVENTION

Figure 1:
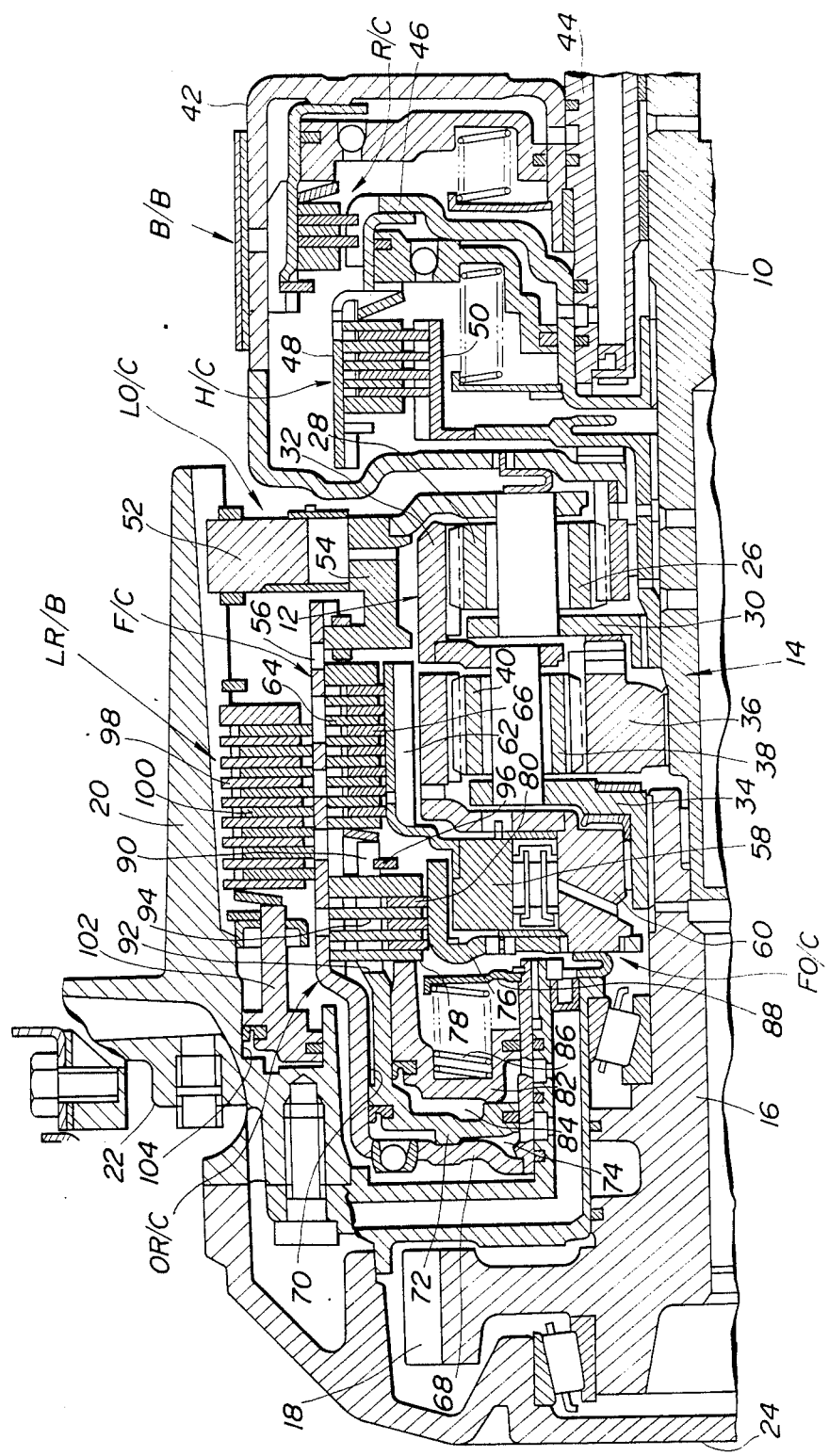
FIG. 1 is an axial longitudinal cross-sectional view through an embodiment of a change speed transmission to the present invention illustrating structural improvements.

Referring to FIG. 1, which illustrates an upper half, with respect to an axis of rotation of an input member or shaft 10, of the axial longitudinal cross-sectional of a change speed transmission according to the present invention, the transmission includes two planetary gear sets, i.e., a first planetary gear set and a second planetary gear set which are generally designated by reference numerals 12 and 14, respectively. These planetary gear sets 12 and 14 are disposed radially outwardly of the input shaft 10. The engine drive is delivered to the input shaft 10 via a torque converter, not shown, in a conventional manner. An output member or shaft 16 is integral with an output gear 18. The drive may be delivered from the output gear 18 to vehicle driving wheels via an idle gear on one end an idle shaft, a pinion on the opposite end of the idle shaft, a ring gear of a differential, and a pair of axles connected with the vehicle driving wheels, in a conventional manner. The transmission includes a generally drum-shaped stationary part 20 which forms a part of a transmission case 22 which has one end closed by a cover 24.

The first planetary gear set 12 comprises a sun gear 26, a plurality of planet pinions 28 with a planet carrier 30 supporting thereon the planet pinions 28, and a ring gear 32. Each planet pinion 28 is in meshing engagement with both sun and ring gear 26 and 32. The ring gear 32 is drivingly connected with a planet carrier 34 of the second planetary gear set 14. The second planetary gear set 14 further comprises a sun gear 36, a plurality of planet pinions 38 rotatably supported by the planet carrier 34, and a ring gear 40. The planet pinions 38 are in meshing engagement with the sun and ring gear 36 and 40.

The first and second planetary gear sets 12 and 14 are disposed in tandem and thus they may be called as a front and a rear planetary gear set, respectively. The sun gear 36 is splined to the input shaft 10 and thus drivingly connected for unitary rotation therewith. The planet carrier 34 is splined to the output member 16 and thus drivingly connected for unitary rotation therewith.

These planetary gear sets 12 and 14 are selectively controlled by clutch and brake means to provide four forward speed ratios and a reverse speed ratio. The third speed ratio is the direct drive and the fourth speed ratio is an overdrive. The clutch and brake means comprise a high clutch H/C, a reverse clutch R/C, a band brake B/B, a forward clutch F/C, an overrun clutch OR/C, a low one-way clutch LO/C (or low one-way brake), a forward one-way clutch FO/C, and a low & reverse brake LR/B.

The reverse clutch R/C has a drum-shaped member 42 rotatably supported by a stationary sleeve 44 which rotatably supports the input shaft 10. The drum-shaped member 42 is splined to the sun gear 26 so that the sun gear 26 is drivingly connected for unitary rotation with the drum-shaped member 42. The reverse clutch R/C further includes a hub 46 splined to the input shaft 10. The reverse clutch R/C is operative for selectively connecting the sun gear 26 with the input shaft 10. The high clutch H/C includes an outer hub 48 secured to the hub 46 of the reverse clutch R/C, and an inner hub 50 splined to the planet carrier 30 for unitary rotation therewith. The high clutch H/C is operative for selectively connecting the planet carrier 30 with the input shaft 10. The band brake B/B includes as a brake drum an outer surface of the drum-shaped member 42. It is operative for selectively braking the sun gear 26.

The low one-way clutch LO/C is disposed radially outwardly of the first planetary gear set 12 and includes an outer race 52 connected with the stationary part 20 and an inner race 54 connected with the planet carrier 30. The low one-way clutch LO/C prevents reverse rotation of the planet carrier 30 even though it allows forward rotation thereof. The planet carrier 30 is selectively connectable with the ring gear 40 via the inner race 54 of the low one-way clutch LO/C, a drum-shaped member 56 of the forward clutch F/C, an outer race 58 of the forward one-way clutch FO/C, and an inner race 60 thereof. This connection is established when the forward clutch F/C is engaged. As illustrated, the forward one-way clutch FO/C is disposed in tandem with respect to the second planetary gear set 14. The inner race 60 of the forward one-way clutch FO/C is connected with the ring gear 40.

The forward clutch F/C further includes a hub 62 connected with the outer race 58. The hub 62 extends over the second planetary gear set 14 radially outwardly thereof and disposed radially inwardly of and opposite to the drum-shaped member 56. A plurality of interleaved friction plates 64, 66 of the forward clutch F/C are operatively disposed between the drum-shaped member 56 and the hub 62. The drum-shaped member 56 is disposed radially inwardly of the stationary part 20 and extends over the second planetary gear set 14 and at least part of the first planetary gear set 12. At right end thereof as viewed in FIG. 1, the drum-shaped member 56 is connected for unitary rotation with the inner race 54 of the low one-way clutch LO/C. A L-shaped disk member 68 integral with the drum-shaped member 56 forms an annular cylinder 70 which slidably receives an actuating piston 72 for the interleaved friction plates 64, 66. The actuating piston 72 defines a servo chamber 74 within the annular cylinder 70.

The overrun clutch OR/C includes a hub 76 connected with the inner race 60 of the forward one-way clutch FO/C. This hub 76 extends over the outer race 58 of the forward one-way clutch FO/C and disposed radially inwardly of the hub 62 of the forward clutch F/C. The overrun clutch OR/C further includes a plurality of interleaved friction plates 78, 80 operatively disposed between the hub 76 and the drum-shaped member 56. An actuating piston 82 for the interleaved friction plates 78, 80 is slidably disposed within the actuating piston 74 and defines therein a servo chamber 84. For biasing the actuating piston 82 and in turn the actuating piston 72 to a rest position, a common return spring 86 is provided which has one end bearing against a spring retainer 88 fixedly secured to the L-shaped disk member 68 and an opposite end bearing against the actuating piston 82 of the overrun clutch OR/C.

The actuating piston 72 of the forward clutch F/C includes an apertured end portion 90 formed with a plurality of axial openings 92 cut inwardly from the axial end thereof. The apertured end portion 90 extends over the hub 76 and radially outwardly thereof. The axial openings 92 formed in the apertured end portion 90 allow the friction plates 78 to extend therethrough and thereby allow them to be splined to the drum-shaped member 56 of the forward clutch F/C. More specifically, each of the friction plates 78 are formed with a plurality of radial arms 94 extending through the axial openings 92 of the apertured end portion 90. The overrun clutch OR/C includes a stop ring 96 supported by the apertured end portion 90 of the actuating piston 72 of the forward clutch F/C. This arrangement permits the actuating piston 82 to be slidably received within the actuating piston 72 thereby provides the compact arrangement including the forward clutch F/C and overrun clutch OR/C.

The arrangement of the stop ring 96 and the dimension of the actuating piston 82 have to be determined such that the interleaved friction plates 78, 80 remain disengaged during unitary movement of the actuating piston 82 with the actuating piston 72 of the forward clutch F/C against the return spring 86.

The low & reverse brake LR/B includes a plurality of interleaved friction plates 98, 100 operatively disposed between the drum-shaped member 56 of the forward clutch F/C and the stationary part 20, and an actuating piston 102 disposed within an annular cylinder 104 formed in the stationary part. In this manner, the low & reverse brake LR/B is operatively disposed radially outwardly of the drum-shaped member 56 of the forward clutch F/C and radially inwardly of the stationary part 20.

OPERATION

The shifting of the change speed transmission illustrated in FIG. 1 is as follows:

First Speed

For purposes of achieving first speed ratio, the forward clutch F/C is engaged by actuation of the actuating piston 72. The actuating piston 72 is actuated to move toward the interleaved friction plates 64, 66 in response to hydraulic fluid pressure build-up in the servo chamber 74. Even though the actuating piston 82 biased by the return spring 86 against the actuating piston 72 follows the movement of the actuating piston 72, the overrun clutch OR/C remains disengaged. As a result of the engagement of the forward clutch F/C, the forward one-way clutch FO/C and the low one-way clutch LO/C are operative to prevent reverse rotation of the ring gear 40 so that the drive takes place from the input shaft 10 over the sun gear 36, planet pinions 38 and planet carrier 34 and therewith to the output member 16 formed with the output gear 18. The first planetary gear 12 idles. It will now be appreciated that the forward clutch F/C, forward one-way clutch FO/C, and low one-way clutch provide, when the forward clutch F/C is engaged, a path of transmission of reaction to the stationary part 20 thereby establish a path of transmission of torque through the second planetary gear set 14 to achieve the first speed ratio. If engine braking is required, the overrun clutch OR/C is engaged and low & reverse brake LR/B is engaged to hinder the action of the forward one-way clutch FO/C and that of the low one-way clutch LO/C. The actuation of the overrun clutch OR/C is initiated by supplying hydraulic fluid pressure to the servo chamber 84.

Second Speed

In second speed, the forward clutch F/C remains engaged. However, the band brake B/B is now engaged. As a result thereof, the sun gear 26 of the first planetary gear set 12 is braked so that the planet carrier 30 and thus the ring gear 40 now rotates in the forward direction thereby causes the output member 16 to rotates at a higher speed. If engine braking is required, the overrun clutch OR/C is engaged.

Third Speed

In third speed, the forward clutch remains engaged, the band brake B/B is disengaged, and the high clutch H/C is engaged. As a result thereof, both planetary gear sets 12 and 14 are locked in themselves and rotate as a unit thereby providing a direct drive. If engine braking is required, the overrun clutch OR/C is engaged.

Fourth Speed

In fourth speed, both forward clutch F/C and high clutch H/C remain engaged, and the band brake B/B is engaged so that the drive takes place from the input shaft 10 over the planet carrier 30 of the first planetary gear set 12, planet pinions 28, ring gear 32, and planet carrier 34 and therewith to the output member 16 with the output gear 18. In all of forward speeds, the forward one-way clutch FO/C allows the ring gear 40 to rotate in the forward direction at a speed higher than the planet carrier 30 rotates in the same forward direction.

Reverse Speed

For purposes of obtaining reverse speed, both reverse clutch R/C and low & reverse brake LR/B are engaged simultaneously while clutches F/C, H/C, and OR/C and band brake B/B are disengaged so that the drive takes place from the input shaft 10 over the sun gear 26 of the first planetary gear set 12, planet pinions 28, ring gear 32, planet carrier 34 of the second planetary gear set 14 and therewith to the output member 16 with the output gear 18 thereby provide a reverse drive.

The pattern of engagement and disengagement of the above mentioned clutches and brakes are illustrated in FIG. 2.

What is claimed is:

1. A change speed transmission, comprising:
   a stationary part;
   an input member;
   an output member;
   first and second planetary gear sets;
   clutch and brake means for selectively controlling said first and second planetary gear sets to provide a plurality of forward speed rations and a reverse speed ratio between said input and output members;
   said clutch and brake means including a first clutch, a first one-way clutch, and a second one-way clutch which, when said first clutch is engaged, provide a path of transmission of reaction to said stationary part thereby establishing a path of transmission of torque through at least a part of said first and second planetary gear sets to achieve a predetermined one speed ratio of said plurality of forward speed ratios;
   said clutch and brake means including also a brake and a second clutch which, when both of said brake and said second clutch are engaged, hinder the action of said second one-way clutch and that of said first one-way clutch, respectively, thereby providing engine braking during running with said predetermined one speed ratio;
   said first clutch including means forming a drum-shaped member disposed radially outwardly of and receiving at least one of said first and second planetary gear sets, and an actuating piston of said first clutch; and
   said second clutch including an actuating piston slidably disposed within said actuating piston of said first clutch.

2. A change speed transmission as claimed in claim 1, wherein said drum-shaped member is disposed radially inwardly of said stationary part, and said brake is operatively disposed between said stationary part and said drum-shaped member.

3. A change speed transmission as claimed in claim 2, wherein said first clutch is a forward clutch, said second clutch is an overrun clutch, said first one-way clutch is a forward one-way clutch, said second one-way clutch is a low one-way clutch, and said brake is a low & reverse brake.

4. A change speed transmission as claimed in claim 3, wherein each of said first and second planetary gear sets includes a sun gear, at least one planet pinion with a plant carrier supporting thereon the respective planet pinion, and a ring gear, each planet pinion being in meshing engagement with a respective sun gear and ring gear, and wherein the sun gear of said second planetary gear set is connected with said input member, the planet carrier of said second planetary gear set is connected with the ring gear of said first planetary gear set and also with said output member.

5. A change speed transmission, comprising:
   a stationary part;
   an input member;
   an output member;
   first and second planetary gear sets;
   clutch and brake means for selectively controlling said first and second planetary gear sets to provide a plurality of forward speed ratios and a reverse speed ratio;
   said clutch and brake means including a first clutch, a first one-way clutch, and a second one-way clutch which, when said first clutch is engaged, provide a path of transmission of reaction to said stationary part thereby establishing a path of transmission of torque through at least a part of said first and second planetary gear sets to achieve a predetermined one speed ratio of said plurality of forward speed ratios;
   said clutch and brake means including also a brake and a second clutch which, when both of said brake and said second clutch are engaged, hinder the action of said second one-way clutch and that of said first one-way clutch, respectively, thereby providing engine braking during running with said predetermined one speed ratio;
   said first clutch including means forming a drum-shaped member, and an actuating piston;
   said second clutch including an actuating piston slidably disposed within said actuating piston of said first clutch;
   said drum-shaped member being disposed radially inwardly of said stationary part, and said brake being operatively disposed between said stationary part and said drum-shaped member;

said first clutch being a forward clutch, said second clutch being an overrun clutch, said first one-way clutch being a forward one-way clutch, said second one-way clutch being a low one-way clutch, and said brake being a low and reverse brake;

each of said first and second planetary gear sets including a sun gear, at least one planet pinion with a planet carrier supporting thereon the respective planet pinion, and a ring gear, each planet pinion being in meshing engagement with a respective sun gear and ring gear, and wherein the sun gear of said second planetary gear set being connected with said input member, the planet carrier of said second planetary gear set being connected with the ring gear of said first planetary gear set and also with said output member; and said forward one-way clutch including an inner race connected with the ring gear of said second planetary gear set, and an outer race, wherein said forward clutch includes a first hub connected with said outer race of said forward one-way clutch and extends over said second planetary gear set radially outwardly thereof and disposed radially inwardly of said drum-shaped member, and a plurality of interleaved friction plates operatively disposed between said drum-shaped members and said first hub.

6. A change speed transmission as claimed in claim 5, wherein said overrun clutch includes a second hub connected with said inner race of said forward one-way clutch and extending over said outer race of said forward one-way clutch and disposed radially inwardly of said first hub, and a plurality of interleaved friction plates operatively disposed between said drum-shaped member and said second hub.

7. A change speed transmission as claimed in claim 6, wherein said drum-shaped member forming means include a L-shaped disk member integral with said drum-shaped member to form an annular cylinder slidably receiving said actuating piston of said forward clutch, and said actuating piston of said forward clutch includes an apertured end portion extending over said second hub and radially outwardly thereof, said portion being formed with a plurality of axial openings which allow some of said plurality of interleaved friction plates of said overrun clutch to extend therethrough.

8. A change speed transmission as claimed in claim 7, wherein each of said some of said plurality of interleaved friction plates of said overrun clutch is formed with a plurality of radial arms extending through said plurality of axial openings, respectively, and connected with said drum-shaped member.

9. A change speed transmission as claimed in claim 8, wherein said forward clutch includes a reaction spring having one end bearing against a spring retainer fixed to said L-shaped disk member and an opposite end bearing against said actuating piston of said overrun clutch thereby biasing said actuating piston of said overrun clutch and in turn said actuating piston of said forward clutch toward a rest position thereof.

10. A change speed transmission as claimed in claim 9, wherein said overrun clutch includes a stop ring which provides a limit to movement of said plurality of friction plates thereof, said stop ring being supported by said apertured end portion of said actuating piston of said forward clutch.

11. A change speed transmission as claimed in claim 10, wherein said overrun clutch is constructed and arranged such that said plurality of interleaved friction plates remain disengaged during unitary movement of said actuating piston thereof with said actuating piston of said forward clutch against said return spring, whereby the movement of said actuating piston of said forward clutch will not cause engagement of said plurality of interleaved friction plates of said overrun clutch.

12. A change speed transmission as claimed in claim 11, wherein said low one-way clutch includes an outer race connected with said stationary part and an inner race connected with said drum-shaped member and the planet carrier of said first planetary gear set.

13. A change speed transmission as claimed in claim 12, wherein said clutch and brake means includes a band brake operative f-or selectively braking the sun gear of said first planetary gear set, a high clutch operative for selectively connecting the planet carrier of said first planetary gear set with said input member, and a reverse clutch operative for selectively connecting the sun gear of said first planetary gear set with said input member.

14. A change speed transmission as claimed in claim 13, wherein said stationary part is formed with an annular cylinder, and said low & reverse brake includes an actuating piston slidably received by said annular cylinder.

15. A change speed transmission, comprising:
a stationary part;
an input member;
an output member;
first and second planetary gear sets;
clutch and brake means for selectively controlling said first and second planetary gear sets to provide a plurality of forward speed ratios and a reverse speed ratio between said input and output members;
said clutch and brake means including a first clutch, a first one-way clutch, and a second one-way clutch which, when said first clutch is engaged, provide a path of transmission of reaction to said stationary part thereby establishing a path of transmission of torque through at least a part of said first and second planetary gear sets to achieve a predetermined one speed ratio of said plurality of forward speed ratios;
said clutch and brake means including also a brake and a second clutch which, when both of said brake and said second clutch are engaged, hinder the action of said second one-way clutch and that of said first one-way clutch, respectively, thereby providing engine braking during running with said predetermined one speed ratio;
said first clutch including means forming a drum-shaped member, and an actuating piston of said first clutch;
said second clutch including an actuating piston slidably disposed within said actuating piston of said first clutch;
wherein said drum-shaped member is disposed radially inwardly of said stationary part, and said brake is operatively disposed between said stationary part and said drum-shaped member;
said second clutch including an actuating piston slidably disposed within said actuating piston of said first clutch;
wherein said first clutch is a forward clutch, said second clutch is an overrun clutch, said first one-way clutch is a forward one-way clutch, said second one-way clutch is a low one-way clutch and said brake is a low and reverse brake;

wherein each of said first and second planetary gear sets includes a sun gear, at least one planet pinion with a planet carrier supporting thereon the respective planet pinion, and a ring gear, each planet pinion being in meshing engagement with a respective sun gear and ring gear, and wherein the sun gear of said second planetary gear set is connected with said input member, the planet carrier of said second planetary gear set is connected with the ring gear of said first planetary set and also with said output member; and wherein said forward one-way clutch includes an inner race connected with the ring gear of said second planetary gear set, and an outer race, wherein said forward clutch includes a first hub connected with said outer race of said forward one-way clutch and extending over said second planetary gear set radially outwardly thereof and disposed radially inwardly of said drum-shaped member, and a plurality of interleaved friction plates operatively disposed between said drum shaped members and said first hub.

16. A change speed transmission as claimed in claim 15, wherein said overrun clutch includes a second hub connected with said inner race of said forward one-way clutch and extending over said outer race of said forward one-way clutch and disposed radially outwardly of said first hub, and a plurality of interleaved friction plates operatively disposed between said drum-shaped member and said second hub.

17. A change speed transmission as claimed in claim 16, wherein said drum-shaped member forming means includes an L-shaped disk member integral with said drum-shaped member to form an annular cylinder slidably receiving said actuating piston of said forward clutch, and said actuating piston of said forward clutch includes an apertured end portion extending over said second hub and radially outwardly thereof, said portion being formed with a plurality of axial openings which allow some of said plurality of interleaved friction plates of said overrun clutch to extend therethrough.

18. A change speed transmission as claimed in claim 17, wherein each of said some of said plurality of interleaved friction plates of said overrun clutch is formed with a plurality of radial arms extending through said plurality of axial openings, respectively, and connected with said drum-shaped member.

19. A change speed transmission as claimed in claim 18, wherein said forward clutch includes a reaction spring having one end bearing against a spring retainer fixed to said L-shaped disk member and an opposite end bearing against said actuating piston of said overrun clutch thereby biasing said actuating piston of said overrun clutch and in turn said actuating piston of said forward clutch toward a rest position thereof.

20. A change speed transmission as claimed in claim 19, wherein said overrun clutch includes a stop ring which provides a limit to movement of said plurality of friction plates thereof, said stop ring being supported by said apertured end portion of said actuating piston of said forward clutch.

21. A change speed transmission as claimed in claim 20, wherein said overrun clutch is constructed and arranged such that said plurality of interleaved friction plates remain disengaged during unitary movement of said actuating piston thereof with said actuating piston of said forward clutch against said return spring, whereby the movement of said actuating piston of said forward clutch will not cause engagement of said interleaved friction plates of said overrun clutch.

22. A change speed transmission as claimed in claim 21, wherein said low one-way clutch includes an outer race connected with said stationary part and an inner race connected with said drum-shaped member and the planet carrier of said first planetary gear set.

23. A change speed transmission as claimed in claim 22, wherein said clutch and brake means includes a band brake operative for selectively braking the sun gear of said planetary gear set, a high clutch operative for selectively connecting the planet carrier of said first planetary gear set with said input member, and a reverse clutch operative for selectively connecting the sun gear of said first planetary gear set with said input member.

24. A change speed transmission as claimed in claim 23, wherein said stationary part is formed with an annular cylinder, and said low and reverse brake includes an actuating piston slidably received by said annular cylinder.

25. A change speed transmission, comprising;
a stationary part;
an input member;
an output member;
a first planetary gear set and a second planetary gear set which are operatively connected with each other and operatively disposed between said input and output members;
clutch and brake means for controlling said first and second planetary gear sets to provide a plurality of forward speed ratios and a reverse speed ratio;
said clutch and brake means including a first clutch, a second clutch, a first one-way clutch, a second one-way clutch, and a brake;
said first clutch including means forming a drum-shaped member disposed radially outwardly of and receiving at least one of said first and second planetary gear sets and an actuating piston; and
said second clutch including an actuating piston slidably disposed within said actuating piston of said first clutch.

26. A change speed transmission as claimed in claim 25, wherein said first one-way clutch has an inner race connected with a portion of said first and second planetary gear sets and said second clutch has clutch elements thereof operatively disposed between said inner race of said first one-way clutch and said drum-shaped member of said first clutch, and wherein said second one-way clutch has an inner race connected with said drum-shaped member and an outer race connected with said stationary part.

27. A change speed transmission as claimed in claim 25, wherein said drum-shaped member is disposed radially inwardly of said stationary part, and said brake has brake elements thereof operatively disposed between said stationary part and said drum-shaped member, and wherein said second one-way clutch has an outer race connected with said stationary part and an inner race connected with said drum-shaped member.

28. A change speed transmission as claimed in claim 27, wherein said first one-way clutch has an inner race connected with a portion of said first and second planetary gear sets and said second clutch has clutch elements thereof operatively disposed between said inner race of said first one-way clutch and said drum-shaped member of said first clutch.

29. A change speed transmission as claimed in claim 28, wherein said first one-way clutch has an outer race and said first clutch has clutch elements thereof operatively disposed between said outer race of said first one-way clutch and said drum-shaped member thereof.

30. A change speed transmission as claimed in claim 29, wherein said inner race of said second one-way clutch is connected with another portion of said first and second planetary gear sets.

31. A change speed transmission as claimed in claim 30, wherein said actuating piston of said second clutch define within said actuating piston of said first clutch a servo chamber.

* * * * *